Nov. 8, 1955 K. P. SMITH 2,723,145
AUTOMOBILE DOOR LOCK
Filed Aug. 13, 1951 2 Sheets-Sheet 2

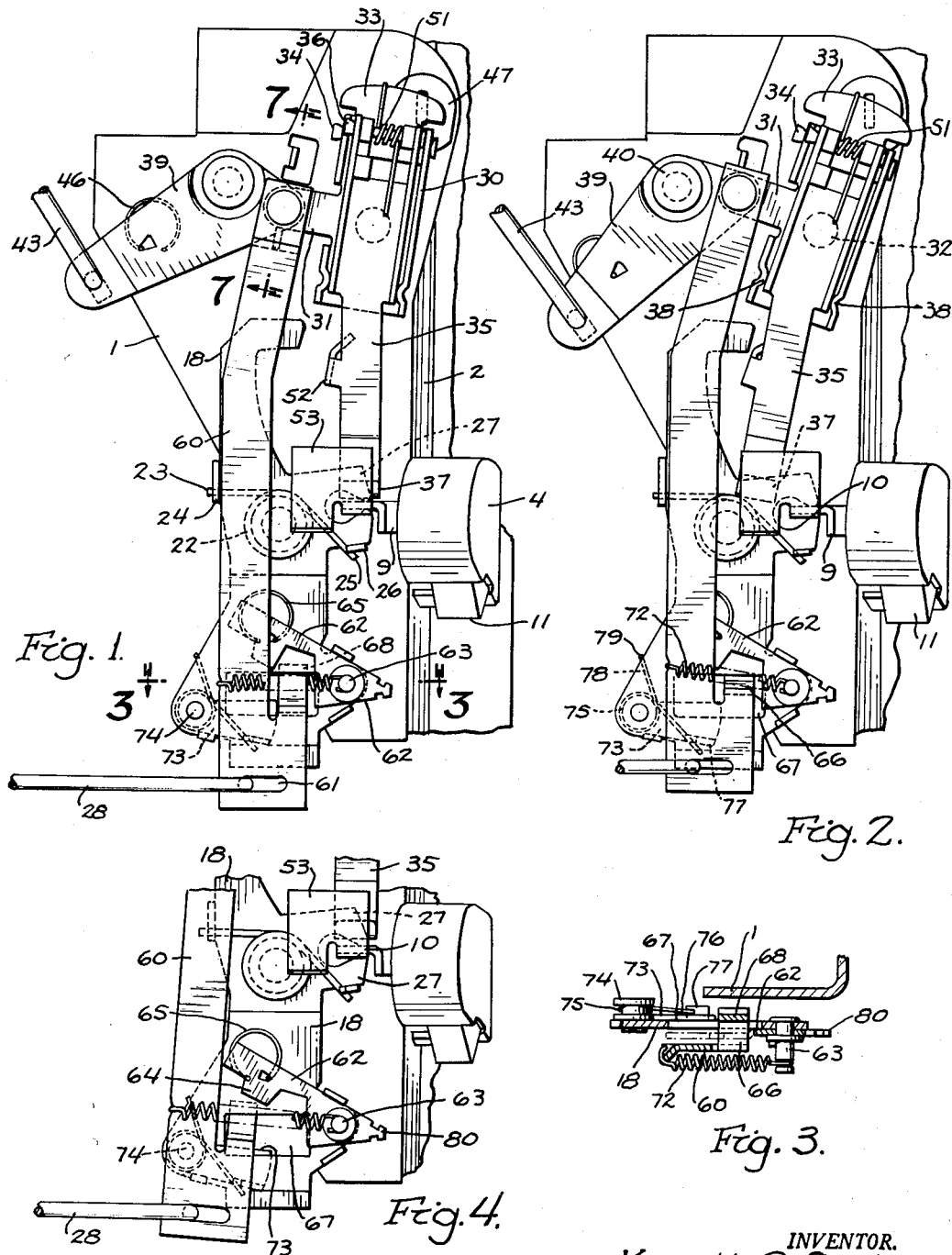

INVENTOR.
Kenneth P. Smith
BY
Barnes, Kisselle, Laughlin & Raisch
ATTORNEYS.

United States Patent Office 2,723,145
Patented Nov. 8, 1955

2,723,145

AUTOMOBILE DOOR LOCK

Kenneth P. Smith, Huntington Woods, Mich., assignor to General Motors Corporation, Detroit, Mich., a corporation of Delaware Application August 13, 1951, Serial No. 241,530

7 Claims. (Cl. 292—223)

This invention relates to an automobile door lock.

It is old to lock an automobile door by disconnecting the outside handle or push button from the lock bolt so that the handle or push button is ineffective to retract the bolt, see Andersen-Bowlus 2,039,873.

It is also old to arrange an automobile door lock so that locking of the outside door handle also locks the inside door handle. This is particularly desirable as a safety feature in the rear door locks of an automobile where children are being transported. Thus, children are prevented from opening the doors and the dangers incident thereto, while the car is in motion, are avoided. It is quite essential from the safety standpoint that in those cases where the inside door handle is locked or rendered ineffective to retract the bolt, that it should be readily, and with certainty, returned to unlocked or operative condition where it will be effective to retract the latch bolt.

Some of the locks heretofore used which were arranged to lock the inside door handle or disconnect the same from the latch bolt were undesirable because under some conditions the lock would become jammed and thereafter the inside handle, and in many instances also the outside door handle or push button, would be ineffective to retract the latch bolt. This undesirable jamming of the lock occurred in one known make of lock wherein the door was locked from within the automobile body by disconnecting the inside handle from the bolt, when the inside handle was held in bolt retracting position and simultaneously the garnish molding push button was lifted in the attempt to again restore the connection between the inside handle and the bolt.

It is an object of this invention to produce an automobile door lock in which the door can be locked from the inside by disconnecting the inside handle from the latch bolt and wherein the inside door handle can again be restored to operative position where it is effective to retract the bolt with complete assurance and without jamming regardless of the conditions under which restoring of the connection between the inside handle and lock bolt is attempted.

Fig. 1 is an elevation of the lock, which is the subject of this invention, as viewed from within the vehicle body. As shown, the bolt can be retracted from both the inside and outside of the vehicle.

Fig. 2 is a view similar to Fig. 1 but showing the bolt disconnected from the outside retractor.

Fig. 3 is a section along the line 3—3 of Fig. 1.

Fig. 4 is a fragmentary view of the lower portion of the lock.

Figure 5:
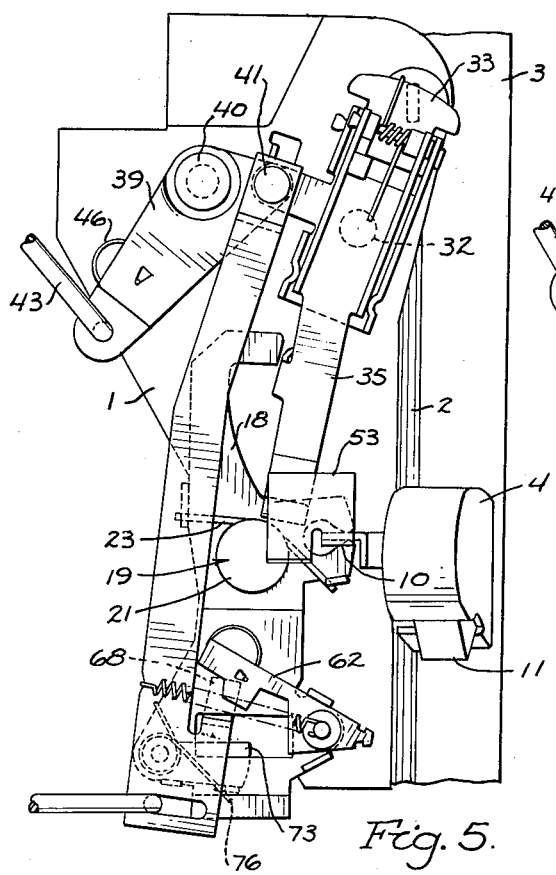
Fig. 5 is an elevation of the lock viewed from within the vehicle body with both the inside and outside retractors disconnected from the bolt and with the inside retractor in bolt retracting position.

The present invention is concerned with that type of lock wherein the door is locked by disconnecting the inner and outer bolt retracting mechanisms from the bolt. The basic structure of the lock shown in the drawings is the same as that shown in the copending application of Kenneth P. Smith, Serial No. 212,891, filed February 27, 1951.

Figure 8:
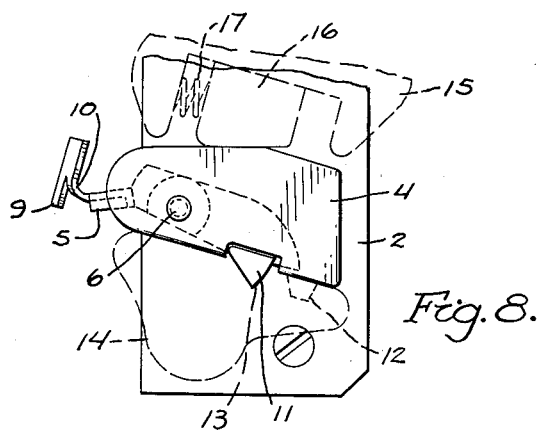
Fig. 8 is an elevation of the lock as viewed from the lock end of the door and with the latch keeper or striker indicated in dotted lines.
Figure 7:
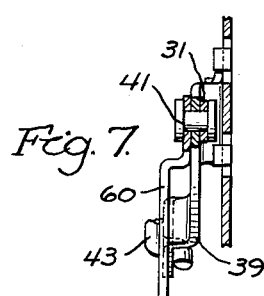
Fig. 7 is a section along the line 7—7 of Fig. 1.

As shown in Fig. 1, the various elements of the lock are mounted upon a lock frame or plate 1. Frame 1 is mounted along the inner face of the inside door panel (not shown) and is provided with a portion 2 which extends along the inner face of the door lock pillar (not shown). The overlap flange of the door is designated 3. A combination bolt housing and wedge member 4 is fixed upon the frame portion 2. A bolt 5 is pivoted within housing 4 upon a stud 6 which is riveted to the frame portion 2 (Fig. 8). Bolt 5 is provided with an offset extension or tail 9 which is provided with a socket portion 10 positioned inwardly of the lock frame portion 1. The bolt head is designated 11 and is adapted to interengage with either the safety step 12 or the final step 13 of the lock keeper 14 which forms the lower member of the dovetail socket. The upper member of the dovetail socket is designated 15 and is provided with a conventional sliding shoe 16 backed up by a compression spring 17. Dovetail socket 14, 15 will be mounted upon the body lock pillar (not shown). Lock frame portion 1, Fig. 1, is positioned at approximately right angles to frame portion 2.

For retracting bolt 5 there is provided a retractor lever 18 pivoted upon frame 1 by means of a stud 19 which is riveted to frame 1. Stud 19 is provided with a head 21 upon which is mounted a coil spring 22. One arm 23 of the spring is interengaged with a lug 24 struck out of frame 1 and the other arm 25 of spring 22 is interengaged with a lug 26 turned out of lever 18. Spring 22 at all times acts through lug 26 to bias or apply torque to lever 18 in a counterclockwise direction, Fig. 1. Lever 18 is provided with a pair of fingers 27 which engage on opposite sides of bolt tail 9 and form a socket therefor. Spring 22 acts at all times through lever 18, fingers 27 on bolt extension 9 to bias bolt 5 clockwise, or in a keeper engaging direction, as viewed in Fig. 8. Lever 18 can be actuated from within the vehicle by means of a draft link 28 which may be connected to any conventional inside remote crank handle (not shown).

For retracting the bolt 5 from without the door there is provided a channel guide member 30 provided with an arm 31 and pivoted upon the lock frame 1 by rivet 32. A tumbler 33 is pivoted upon channel guide 30 by means of pin 34. An intermittent lever 35 is pivoted to one arm of tumbler 33 by means of pin 36 and the other end 37 of intermittent lever 35 pivotally interengages extension 9 in socket 10. The intermittent lever 35 is guided within the side walls of channel guide 30 by means of bumps 38 so that intermittent lever 35 can slide longitudinally within channel guide 30 and can also pivot or swivel with channel guide 30 about rivet 32. Channel guide 30 can be pivoted about pin 32 from within the vehicle body by means of a control mechanism comprising a lever 39 pivoted to frame 1 by rivet 40 and pivotally connected to arm 31 by rivet 41. The outer end of lever 39 is pivotally connected to a push and pull rod 43. The upper end of rod 43 projects through an opening in the garnish molding which extends around the window opening in a conventional manner and an over-center spring 46 acts upon lever 39 to yieldably hold it in either its unlocked position, Fig. 1, or in its locked position, Fig. 5.

A pawl 47 is journalled in the lock frame 1 and is operatively connected with channel guide 30 so that pawl 47 can be rotated in one direction to swing guide 30 and intermittent lever 35 to locked position, Fig. 5, or pawl 27 can be rotated in the opposite direction to swing guide 30 and intermittent lever 35 to unlocked position, Fig. 1. Pawl 47 can be rotated from the outside of the door by means of a key acting through a combination torque rod and plunger (not shown) which can be pushed inwardly of the door to pivot tumbler 33 against spring 51 to thereby project the intermittent lever 35 downwardly, as viewed in Fig. 1. When intermittent lever 35 is projected downwardly, the lower end 37 contacts the tail 9 of the bolt in socket 10 and rotates the bolt 5 counterclockwise, Fig. 8, to retract the bolt from its keeper. A cylinder lock push button and push rod for operating tumbler 33 form no part of this invention and are shown in the copending application of James D. Leslie and Clyde H. Schamel, Serial No. 788,534, filed November 28, 1947, now Patent No. 2,641,495.

Intermittent lever 35 is provided with a cam projection 52 which extends inwardly from lever 35 toward frame 1. Flange 53 on tail 9 overlies the lower end 37 of lever 35. Spring 51 acts between tumbler 33 and intermittent lever 35 not only to hold intermittent lever 35 downwardly within channel guide 30 but also to yieldably bias or hold tumbler 33 against pawl 47 and thus yieldably maintain lever 35 in retracted position, Fig. 1. When lever 35 is in the position shown in Fig. 1, downward movement of lever 35 acts upon tail 9 of bolt 5 to retract the same. Lever 35 is moved downwardly by pivoting tumbler 33 about its pivot 34 as above described. Thus, tumbler 33 and lever 35 are actuated from outside the door for retracting the bolt. When lever 35 and guide 30 are shifted to the position shown in Fig. 2, then end 37 of lever 35 is offset from, and rides by, socket 10 on the bolt tail and therefore the lever 35 is ineffective to retract the bolt, Fig. 4.

Retraction of the lock bolt from the inside of the door is effected by clockwise rotation of lever 18, Fig. 1. Lever 18 is actuated from within the body by means of an inside door handle in the form of a crank (not shown) and connected by draft link 28 with actuator link 60. The upper end of link 60 is pivotally supported on pin 41 and thus pivotally connected to levers 39 and 31. The end of link 28 has a lost motion connection with link 60 in slot 61.

Figure 6:
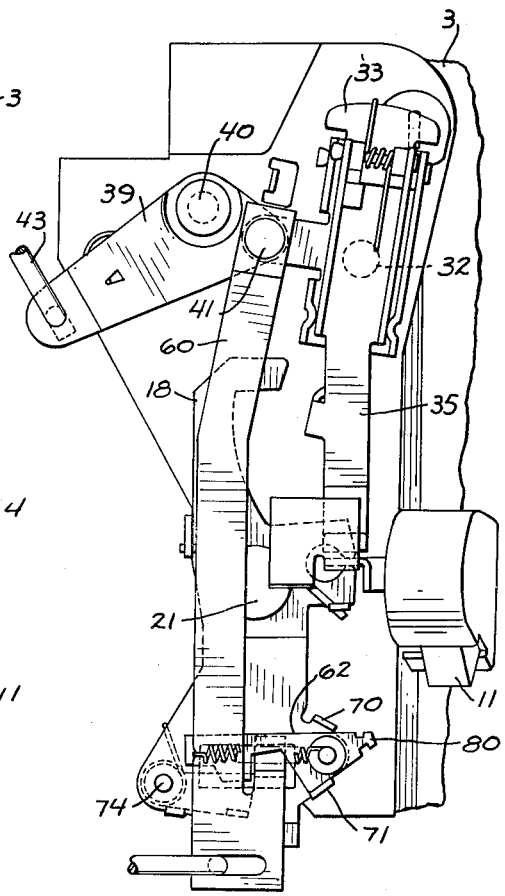
Fig. 6 is an elevation of the lock as viewed from within the vehicle body with both the inside and outside retractors connected to the bolt and with the by-passing mechanism for the inside retractor rendered inoperative so that the inside retractor cannot operate idly with respect to the bolt.

One of the features of this lock is that the inside handle can be optionally disconnected from the bolt each time the outside retractor mechanism is disconnected from the bolt so that the lock is locked both from within and without the car. To this end a freewheeling selector lever 62 is pivoted upon retractor lever 18 by a stud 63. The selector lever 62 is provided with a projection 64 which forms a shoulder. Lever 62 is yieldably held in either its raised position, Fig. 4, or in its lowered position, Fig. 6, by an over-center type spring 65.

The lower end of actuator link 60 is provided with an integral lug or projection 66 which extends backwardly toward lock frame 1 through a large rectangular opening 67 in the lower end of retractor lever 18 and then is turned upwardly as at 68 into overlapping relation with lever 18 above opening 67. Lever 18 also has turned outwardly therefrom two lugs 70 and 71 which serve as abutments or stops for lever 62. In raised position lever 62 abuts stop 70, Fig. 4, and in its lowered position lever 62 abuts lug 71, Fig. 6. A tension spring 72 is anchored at one end to link 60 and at the other end to stud 63 so that the spring yieldably retains lug 66 against the right hand side of opening 67 in lever 18.

A catch 73 is pivoted on the lower left hand end of lever 18 by means of stud 74. A coil spring 75 is mounted on post 74 and one arm 76 of the spring acts against lug 77 turned out of catch 73 to yieldably hold the catch in raised position, Figs. 1 and 5. The other arm 78 of spring 75 is anchored to lever 18 as at 79.

The operation of the instant lock is as follows: As shown in Fig. 1 both the inside and outside retracting mechanisms are connected to the bolt. If the inside handle (not shown) is turned to draw link 28 to the left, this will swing actuator link 60 to the left or clockwise about pin 41. Lug 66 on link 60 will abut catch 73 and the retracting force will be transmitted from link 60 through catch 73 to retractor lever 18 which pivots clockwise and through fingers 27 and bolt neck 9 retracts bolt head 11 from the keeper. If rod 43 is pushed downwardly to pivot lever 39 counterclockwise, then channel 30 and intermittent lever 35 will swing clockwise to the position shown in Fig. 2 and link 60 is raised. If the outside push button (not shown) is pushed inwardly to move intermittent lever 35 downwardly while in the position shown in Fig. 2, then the lower end 37 of the intermittent lever rides freely by socket 10 on the bolt and lever 35 is ineffective to retract the bolt. Still referring to Fig. 2, if the inside handle is turned to swing lever 60 clockwise about pin 41, since lug 66 is positioned above and now clears pivoted catch 73, lug 66 simply moves idly in opening 67 and draft link 28 and link 60 is ineffective to retract lever 18 and consequently the bolt 11 cannot be retracted by the inside handle. In Fig. 2 it should be noted that selector lever 62 is in raised position. Hence, when the lock is in the condition shown in Fig. 2, both the inside retractor or door handle and the outside retractor or push button can be rendered ineffective to retract the bolt either by a key actuation of the cylinder lock and pawl 47 from without the door or by pushing downwardly on push button rod 43.

With this general type of lock passengers occupying the rear seat of the automobile will often try to unlock the inside door handle by manipulating the lock as follows: When the lock is in the condition shown in Fig. 2, the passenger will turn the inside door handle to swing link 60 to the left or bolt retracting position, Fig. 4, and while holding link 60 in bolt retracting position, Fig. 4, the passenger will pull up on the push button rod 43 thereby swinging intermittent lever 35 back to unlocked position and shifting the link 60 downwardly. As link 60 moves downwardly lug 66 simply swings catch 73 downwardly to the position shown in Fig. 4. As soon as the passenger releases the remote handle, spring 72 swings link 60 to the right or counterclockwise from the position shown in Fig. 4 until it rides off catch 73 into the position shown in Fig. 6 where lug 66 is again interengaged with catch 73 and effective to rotate remote lever 18 and retract bolt 11. Thus, it is evident that this lock cannot be jammed even when operated in this rather unorthodox manner. Such an unorthodox operation of the lock occurs either through ignorance or when the rear seat passenger is locked in the car and gets excited or hysterical.

If for any reason it is not desired to have the inside and outside retractors simultaneously disconnected from the bolt, then the instant lock provides an arrangement whereby the inside handle is always connected to the remote lever 18 and only the outside retractor mechanism 33, 35 can be disconnected from the bolt. When it is desired to remove the locking feature of the inside handle, it is only necessary to swing lever 62 from the raised position, shown in Fig. 5, downwardly to the position shown in Fig. 6. When the lock is assembled in a car a hole is provided in the lock pillar flange and an instrument, such as a screwdriver, can be inserted in the hole and brought into contact with the end 80 of lever 62 to pivot it either to raised position, Fig. 5, or to lowered position, Fig. 6. In the lowered position of lever 62, shoulder 64 is always in the path of lug 66. Hence, whenever the remote link 28 is moved to the left, the draft force is transmitted by lug 66 to shoulder 64 on lever 62 and thence through stud 63 to the remote lever 18 which swings clockwise to retract the bolt.

I claim:

1. In a door lock, a frame, a bolt supported on said frame for movement to latched and unlatched positions, means biasing said bolt towards latched position, a retractor movably mounted on said frame and operatively connected with said bolt such that when the retractor is moved in one direction, said bolt is unlatched and when moved in the opposite direction, said bolt is latched, said retractor having an abutment thereon, an actuator on said frame having an abutment thereon, said actuator being pivotable on said frame in one direction to a retracted position wherein said abutments interengage and said retractor is moved in said unlatching direction and in an opposite direction to a projected position wherein said retractor moves in said latching direction under the influence of said biasing means, said actuator also being shiftably supported on said frame for movement to an operative position wherein the abutment on the retractor lies in the pivotal path of travel of the abutment on the actuator and to an inoperative position wherein the abutment on the retractor is in by-passing relation with respect to the pivotal path of travel of the abutment on said actuator, said pivotal and shiftable paths of travel being generally transverse of one another and said abutment on said retractor lying in the shiftable path of travel of the abutment on the actuator when the actuator is in said inoperative retracted position, one of said abutments being movably mounted on its respective member for movement in the same general direction as the direction of shifting movement of said actuator, said movable abutment having a stop face extending generally in the direction of said shifting movement and interengageable with said other abutment in response to pivotal movement of said actuator to said retracted position when the actuator is in the operative position, said movable abutment also having a cam face extending generally in the direction of said pivotal movement and interengageable with said other abutment in response to shifting movement of the actuator to said operative position when in retracted position, said movable abutment being biased in a direction toward the other abutment when the actuator is in said inoperative retracted position, said other abutment and said cam face, when said retractor is shifted from the retracted inoperative position to the retracted operative position and then pivoted to the projected operative position, first interengaging one another to move said movable abutment against the tension of the biasing means acting thereon and then sliding out of interengagement in response to said last mentioned pivotal movement to permit the movable abutment to assume the position to which it is normally biased, a control mechanism on said frame for shifting said actuator to said operative and inoperative positions and a mechanism actuatable from the inside of the door for pivoting said actuator to said retracted position.

2. The combination set forth in claim 1 wherein said movable abutment is mounted on said retractor and said other abutment is fixed on said actuator.

3. The combination set forth in claim 1 wherein said movable abutment is pivotally supported on said retractor.

4. The combination set forth in claim 1 including means pivotally biasing said actuator to said projecting position.

5. The combination set forth in claim 1 including means for yieldably retaining said actuator in either operative or inoperative position.

6. The combination set forth in claim 1 including means for optionally latching said actuator and retractor members together to positively move said retractor when the actuator is pivoted regardless of the position to which said actuator is shifted.

7. The combination set forth in claim 6 wherein said means for latching said actuator and retractor members together comprises a latch pivoted on said one of said two members and engageable with a detent on the other member.

References Cited in the file of this patent

UNITED STATES PATENTS

| | | |
|---|---|---|
| 1,723,802 | Moore | Aug. 6, 1929 |
| 1,769,489 | Garrier | July 1, 1930 |
| 2,234,810 | Simpson | Mar. 11, 1941 |
| 2,236,702 | Andersen | Apr. 1, 1941 |
| 2,272,167 | Cloutier | Feb. 10, 1942 |
| 2,299,353 | Simpson | Oct. 20, 1942 |
| 2,311,094 | Simpson | Feb. 16, 1943 |
| 2,569,042 | Endter | Sept. 25, 1951 |
| 2,674,482 | Meservy | Apr. 6, 1954 |